United States Patent
Lo et al.

(10) Patent No.: US 9,316,885 B2
(45) Date of Patent: Apr. 19, 2016

(54) DISPLAY DEVICE AND FABRICATION METHOD OF DISPLAY DEVICE

(71) Applicant: E Ink Holdings Inc., Hsinchu (TW)

(72) Inventors: Po-Yuan Lo, Hsinchu (TW); Tai-Yuan Lee, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 75 days.

(21) Appl. No.: 14/078,543

(22) Filed: Nov. 13, 2013

(65) Prior Publication Data
US 2014/0185128 A1    Jul. 3, 2014

(30) Foreign Application Priority Data
Dec. 28, 2012   (TW) .............................. 101151059 A

(51) Int. Cl.
*G02F 1/167*     (2006.01)
*G02F 1/1339*     (2006.01)

(52) U.S. Cl.
CPC .............. *G02F 1/167* (2013.01); *G02F 1/1339* (2013.01); *G02F 2001/1672* (2013.01)

(58) Field of Classification Search
CPC ................................... G09G 3/34; G02B 5/00
USPC ..................... 359/238, 296, 491.01
See application file for complete search history.

(56) References Cited

U.S. PATENT DOCUMENTS

| 6,982,178 | B2 | 1/2006 | LeCain et al. | |
| 2003/0053016 | A1* | 3/2003 | Kubota | G02F 1/133553 349/113 |
| 2007/0036919 | A1* | 2/2007 | Wang | C08G 18/10 428/1.54 |
| 2010/0033803 | A1* | 2/2010 | Wang | C08G 18/672 359/296 |
| 2010/0157411 | A1 | 6/2010 | Kwon et al. | |
| 2012/0013983 | A1 | 1/2012 | Chang et al. | |
| 2012/0154344 | A1 | 6/2012 | Peng et al. | |
| 2012/0183721 | A1* | 7/2012 | Niiyama et al. | 428/76 |
| 2012/0293744 | A1* | 11/2012 | Watanabe | G02F 1/133504 349/62 |

(Continued)

FOREIGN PATENT DOCUMENTS

| CN | 1400502 | 3/2003 |
| CN | 101876771 | 11/2010 |

(Continued)

OTHER PUBLICATIONS

"Office Action of Taiwan Counterpart Application," issued on Jan. 13, 2015, p. 1-p. 8.

(Continued)

*Primary Examiner* — Bumsuk Won
*Assistant Examiner* — William R Alexander
(74) *Attorney, Agent, or Firm* — Jianq Chyun IP Office

(57) ABSTRACT

A display device including a first substrate, a second substrate, a display layer, a color filter layer, a transparent electrode layer and a transparent sealing is provided. The first substrate is opposite to the second substrate. The display layer is disposed between the first substrate and the second substrate. The color filter layer is disposed between the display layer and the first substrate. The transparent electrode layer is disposed between the color filter layer and the display layer. The transparent sealing surrounds the display layer so that the display layer is sealed between the first substrate and the second substrate, wherein a curable temperature of the transparent sealing is lower than or equal to 40° C. A fabrication method of a display device is further provided herein.

21 Claims, 3 Drawing Sheets

(56) References Cited

U.S. PATENT DOCUMENTS

2012/0306940 A1* 12/2012 Machida et al. ............. 345/690
2012/0320298 A1* 12/2012 Suzuki .............. G02F 1/133553
  349/43

FOREIGN PATENT DOCUMENTS

| CN | 102109726 | 6/2011 |
| CN | 102549481 | 7/2012 |
| JP | 2010145528 | 7/2010 |
| TW | I308249 | 4/2009 |
| WO | 2011155410 | 12/2011 |

OTHER PUBLICATIONS

"Office Action of China Counterpart Application", issued on Jan. 25, 2016, p1-p8, in which the listed references were cited.

* cited by examiner

DISPLAY DEVICE AND FABRICATION METHOD OF DISPLAY DEVICE

CROSS-REFERENCE TO RELATED APPLICATION

This application claims the priority benefit of Taiwan application serial no. 101151059, filed on Dec. 28, 2012. The entirety of the above-mentioned patent application is hereby incorporated by reference herein and made a part of this specification.

BACKGROUND

1. Field of the Application

The invention relates to a display device, and more particularly, to a multi-color display device.

2. Description of Related Art

In recent year, e-paper and e-book adopt an electrophoretic display technology to achieve the purpose of display. Taken the black and white e-book for example, a display media thereof is constituted by a black electrophoretic liquid and white charged particles dispersed in the black electrophoretic liquid, and through applying voltages, the white charged particles may be driven to move, so that each pixel respectively displays a black color, white color or grayscale.

In the conventional technology, most of the electrophoretic display devices are using reflections of external light sources to achieve the purpose of display, and each pixel may display a required grayscale by applying a voltage to drive the white charged particles in the electrophoretic liquid. Furthermore, in order to expand applications of the electrophoretic display devices, a technology of fabricating color filter layers on a carrier thin film and adhering the film carrying the color filter layers above a display medium via an adhesive layer has also been proposed. As such, after the white charged particles in the electrophoretic liquid reflect the external light, the reflected light may pass through the color filter thin film to perform display.

However, the color filter thin film, by adhering above the display medium through an optical glue or a double-sided adhesive, may increase a thickness of the electrophoretic display device, and the use of the optical glue or the double-sided adhesive may further produce a gap between an electrophoretic display layer and the thin film, thereby causing a loss in an overall reflectivity of the electrophoretic display device.

Moreover, the electrophoretic display device has to use a sealing to surround and seal the display layer, so as to block out external moisture. As such, in a curing process of the sealing, a relative displacement is produced between the externally adhered color filter thin film and the display layer, thereby causing an adverse effect on a display quality of the display device.

SUMMARY OF THE APPLICATION

The invention provides a display device having a favorable display quality and a thinned thickness.

The invention provides a fabrication method of a display device having a favorable yield, so that the display layer less prone to a displacement in positions relative to other films.

The invention provides a display device including a first substrate, a second substrate, a display layer, a color filter layer, a transparent electrode layer and a transparent sealing. The first substrate is opposite to the second substrate. The display layer is disposed between the first substrate and the second substrate. The color filter layer is disposed between the display layer and the first substrate. The transparent electrode layer is disposed between the color filter layer and the display layer. The transparent sealing surrounds the display layer so that the display layer is sealed between the first substrate and the second substrate, wherein a curable temperature of the transparent sealing is lower than or equal to 40° C.

In an embodiment of the invention, the transparent electrode layer is formed on the color filter layer via a non-adhesion manner.

In an embodiment of the invention, the display device further includes a protective film and an adhesive layer. The protective film is adhered onto the first substrate via the adhesive layer, and the transparent sealing is also located between and the protective film and the second substrate. For instance, the protective film is an anti-reflective film, an anti-glare film, an anti-UV film, a light directing film, a polarizing film, and an anti-scratch film or a combination thereof.

In an embodiment of the invention, a material of the transparent sealing is a room temperature curable resin.

In an embodiment of the invention, a material of the transparent sealing is a light curable resin.

In an embodiment of the invention, the display device further includes an active device layer disposed between the second substrate and the display layer.

In an embodiment of the invention, the display layer includes a microencapsulated electrophoretic display layer or a microcup electrophoretic display layer.

In an embodiment of the invention, the first substrate and the second substrate are each a glass substrate or a plastic substrate.

In an embodiment of the invention, a material of the color filter layer includes an ink.

In an embodiment of the invention, a material of the transparent electrode layer includes an organic conductive material, an oxide conductive material or a combination thereof. The organic conductive material includes a polyethylene dioxythiophene (PEDOT) or a polyaniline (PANi).

In an embodiment of the invention, the display device further includes an adhesive layer, and the second substrate and the display layer are adhered to each other via the adhesive layer, The invention further provides a fabrication method of a display device. A color filter layer and a transparent electrode layer are sequentially formed on a first substrate, and the color filter layer is located between the first substrate and the transparent electrode layer. A display layer is formed on the transparent electrode layer. A transparent sealing surrounding the display layer is formed, so that the transparent sealing seals the display layer between the first substrate and the second substrate, wherein a process temperature of curing the transparent sealing is smaller than or equal to 40° C.

In an embodiment of the invention, a material of the transparent sealing is a light curable resin.

In an embodiment of the invention, a fabrication method of a display device includes adhering a protective film on an adhesive layer, enabling the transparent sealing to locate between the protective film and the second substrate when forming a transparent sealing.

In an embodiment of the invention, the color filter layer is formed on the first substrate via an ink-jet method.

In an embodiment of the invention, the transparent electrode layer is formed on the color filter layer via a coating method.

In an embodiment of the invention, a material of the transparent electrode layer comprises a polyethylene dioxythiophene (PEDOT) or a polyaniline (PANi).

In an embodiment of the invention, the fabrication method of the display device further includes adhering the second substrate onto the display layer via an adhesive layer before forming the transparent sealing.

In an embodiment of the invention, the fabrication method of the display device further includes forming an active device layer on the second substrate, and the active device layer is located between the second substrate and the display layer.

According to the foregoing, in the embodiment of the invention, the color filter layer is fabricated between the display layer and a substrate, so as to enhance a display quality of the display device. In particular, a viewing angle of the display device may be improved. Moreover, the transparent sealing material used in the embodiments of the invention does not required to be cured with high temperature, and therefore, the display device in the embodiment of the invention is less prone to displacements relative to the positions of other material layers due to a fabrication process of the transparent sealing. As a result, the display device in the embodiment of the invention has favorable quality and yield.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 1:
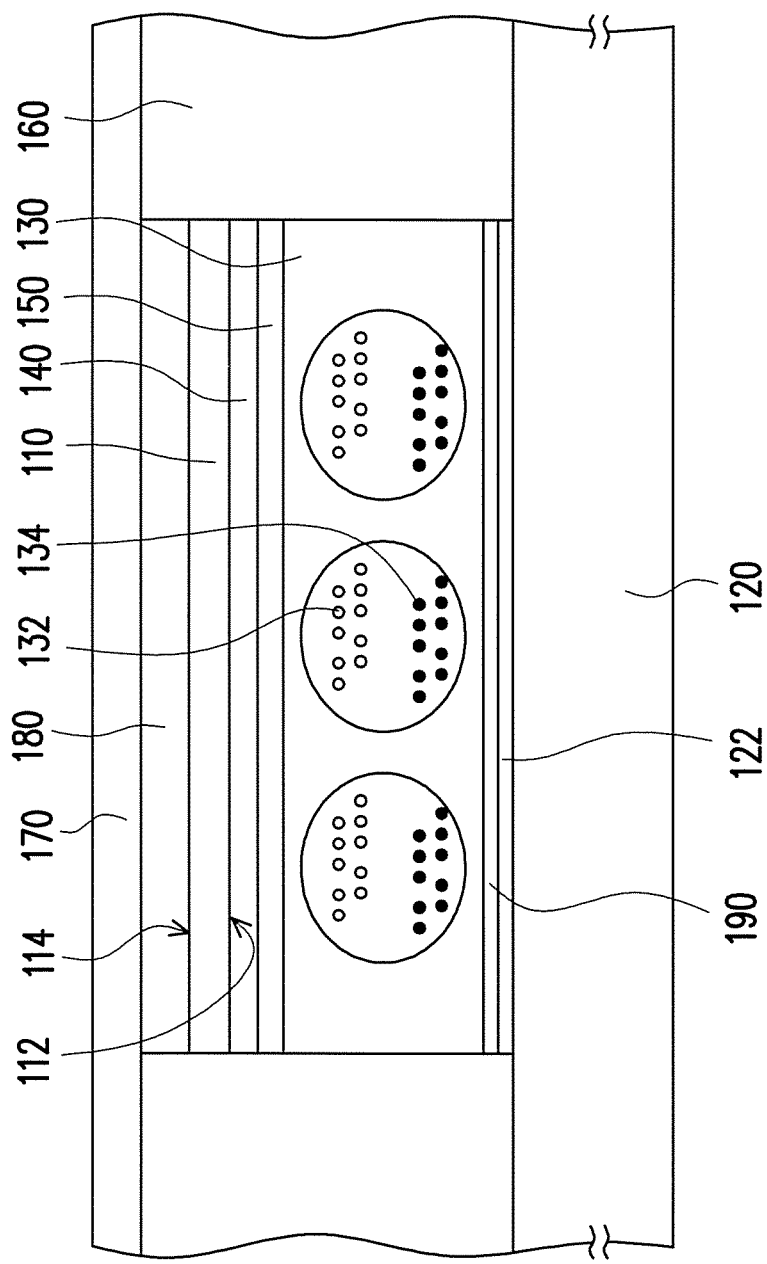
FIG. 1 is schematic diagram illustrating a display device according to an embodiment of the invention.

FIG. 1 is schematic diagram illustrating a display device according to an embodiment of the invention. Referring to FIG. 1, a display device 100 includes a first substrate 110, a second substrate 120, a display layer 130, a color filter layer 140, a transparent electrode layer 150, a transparent sealing 160, a protective film 170 and adhesive layers 180 and 190. The first substrate 110 is disposed opposite to the second substrate 102, and the display layer 130 is disposed between the first substrate 110 and the second substrate 120. The color filter layer 140 and the transparent electrode layer 150 are both disposed between the first substrate 110 and the display layer 130. The protective film 170 is adhered on the first substrate 110 via the adhesive layer 180 and the second substrate 120 is adhered on the display layer 130 via the adhesive layer 190. The transparent sealing 160 surrounds the display layer 130 to seal the display layer 130 between the first substrate 110 and the second substrate 120. Moreover, the second substrate 120 has an active device layer 122 formed thereon, and the active device layer 122 is located between the second substrate 120 and the display layer 130.

Specifically, a fabrication method of the display device 100, for instance, includes the following steps. Firstly, the color filter layer 140 is fabricated on the first substrate 110. A fabrication method of the color filter layer 140 may be any conventional fabrication method of a color filter layer. For example, the fabrication method of the color filter layer 140 may adopt an ink-jet printing method, a screen printing or other printing methods, which may print an ink material onto the first substrate 110. Or, the fabrication method of the color filter layer 140 may adopt a lithography method, which forms a color resin material on the first substrate 110.

In general, a process temperature for fabricating the color filter layer 140 is lower than a tolerable temperature of the first substrate 110, so as to avoid the first substrate 110 from being deformed or deteriorated. Therefore, when the first substrate 110 is a plastic substrate, the color filter layer 140 may be formed on the first substrate 110 by adopting the ink-jet printing method, but the embodiment is not limited thereto. When the first substrate 110 is a glass substrate, the tolerable temperature of the first substrate 110 is higher, and the color filter layer 140 may be fabricated by adopting a process with higher process temperature.

Next, a transparent electrode layer 150 is fabricated on the first substrate 110 that has already formed with the color filter layer 140. Herein, the transparent electrode layer 150 may be directly fabricated on the color filter layer 140, so that the transparent electrode layer 150 is in contact with the color filter layer 140. Or, in other embodiments, before fabricating the transparent electrode layer 150, a transparent insulating layer (not shown in FIG. 1) is firstly covered on the color filter layer 140, and then the transparent electrode layer 140 is fabricated on the transparent insulating layer. In the present embodiment, the transparent electrode layer 150 is formed on the color filter layer 140 in a non-adhesion manner.

A material of the transparent electrode layer 150 may be an oxide conductive material, such as indium tin oxide, indium zinc oxide or so forth, or an organic conductive material, such as polyethylene dioxythiophene (PEDOT), polyaniline (PANi) or so forth, or a combination of the above materials. Since the transparent electrode layer 150 is fabricated on the first substrate 110, a favorable process temperature for fabricating the transparent electrode layer 150 is lower than a tolerable temperature of the first substrate 110. Therefore, in one embodiment, the fabrication method of the transparent electrode layer 150 may be a coating method, such as a rotary coating method, a slit coating method or so forth. Certainly, when the tolerable temperature of the first substrate 110 is higher, the fabrication method of the transparent electrode layer 150 may be a sputtering method, a vapor deposition method or so forth.

After the transparent electrode layer 150 is fabricated, the display layer 130 is formed on the transparent electrode layer 150. As a result, the color filter layer 140, the transparent electrode layer 150 and the display layer 130 are sequentially stacked on the first substrate 110. Under this structural design, there is no adhesive layer or bearing substrate in between the color filter layer 140 and the display layer 130, and this is helpful in reducing a thickness of the display device 100.

In the present embodiment, the display layer 130 may be an electrophoretic display layer, such as a microencapsulated electrophoretic display layer or a microcup electrophoretic display layer. FIG. 1 has taken the use of the microencapsulated electrophoretic display layer as an example for the purpose of illustration. Specifically, the display layer 130 is constituted by packaging display particles 132 and 134 of different colors (e.g., black and white) in microcapsule structures. By using distributions of these display particles 132 and 134 in each microcapsule structure, an image display may be achieved by controlling whether to reflect the external light. A specific display principle may be understood by referring to the conventional electrophoretic display device, and thus details regarding the display principle are not to be described herein.

Next, after the display layer 130 is formed on the first substrate 110, the protective film 170 may be adhered to the other side of the first substrate 110 via the adhesive layer 180. Namely, a first side 112 of the first substrate 110 is sequentially stacked with the color filter layer 140, the transparent electrode layer 150 and display layer 130, a second side 114 of the first substrate 110 is sequentially disposed with the adhesive layer 180 and the protective film 170, wherein the first side 112 and the second side 114 are two opposite sides. The protective film 170 is adhered to the second side 114 of the first substrate 110 via the adhesive layer 180 and may protect the display layer 130 and other structures, so as to avoid damages due to external force, humidity or the like. Herein, the protective film 170 may be an anti-reflective film, an anti-glare film, an anti-UV film, a light directing film, a polarizing film, an anti-scratch film or a combination thereof. Namely, the protective film 170, in addition to provide a protection effect, may also provide a specific optical effect for improving a display effect of the display device 100.

Afterward, the second substrate 120 having formed with the active device layer 122 may be adhered to the other side of the display layer 130 via the adhesive layer 190. Now, the display layer 130 is disposed between the first substrate 110 and the second substrate 120. The active device layer 122 on the second substrate 120 and the transparent electrode layer 150 located on the first substrate 110 may drive the display layer 130 to change the distributions of the display particles 132 and 134 so as to achieve the required light reflection effect. In general, a material of the second substrate 120 may be a glass or plastic. In other embodiments, the active device layer 122 on the second substrate 120 may be replaced with another electrode layer.

In the present embodiment, a size of the second substrate 120 and a size of the protective film 170 are both larger than sizes of the display layer 130 and the first substrate 110. When fabricating the display device 100, the transparent sealing 160 may be disposed between the second substrate 120 and the protective film 170, so that the transparent sealing 160 surrounds the display layer 130. As a result, the display layer 130 may be sealed between the first substrate 110 and the second substrate 120.

A material of the transparent sealing 160 may be a normal temperature curable resin material or a light curable resin material. Specifically, a fabrication method of the transparent sealing 160, for example, is to firstly coat an uncured resin material around the display layer 130, such that the resin material is filled between the second substrate 120 and the protective film 170. Next, a curing process is performed to cure the resin material, wherein the curing process, for example, is a light-curing process, or a temperature required for the curing process is smaller than or equal to 40° C. As such, the fabrication process of curing the transparent sealing 160 does not required a specific heating step and may avoid the already formed components (such as the first substrate 110, the second substrate 120, the display layer 130, the color filter layer 140, the transparent electrode layer 150, the adhesive layers 180 and 190, the protective film 170 and so forth) from being deformed or deteriorated due to a temperature impact.

For example, since the transparent sealing 160 of the present embodiment does not required to be cured with high temperature, the display layer 130 and the color filter layer 140 are less prone to produce a thermal expansion. Now, relative positions of the display layer 130 and the color filter layer 140 are not going to be displaced and maintain a favorable relative position. Moreover, the adhesive layers 180 and 190 are also less prone to deterioration due to the temperature impact, and thereby is helpful in enhancing reliabilities of the adhesive layers 180 and 190. Certainly, the first substrate 110 and the second substrate 120 may also avoid from being damaged, deformed or deteriorated due to the temperature impact.

Figure 2:
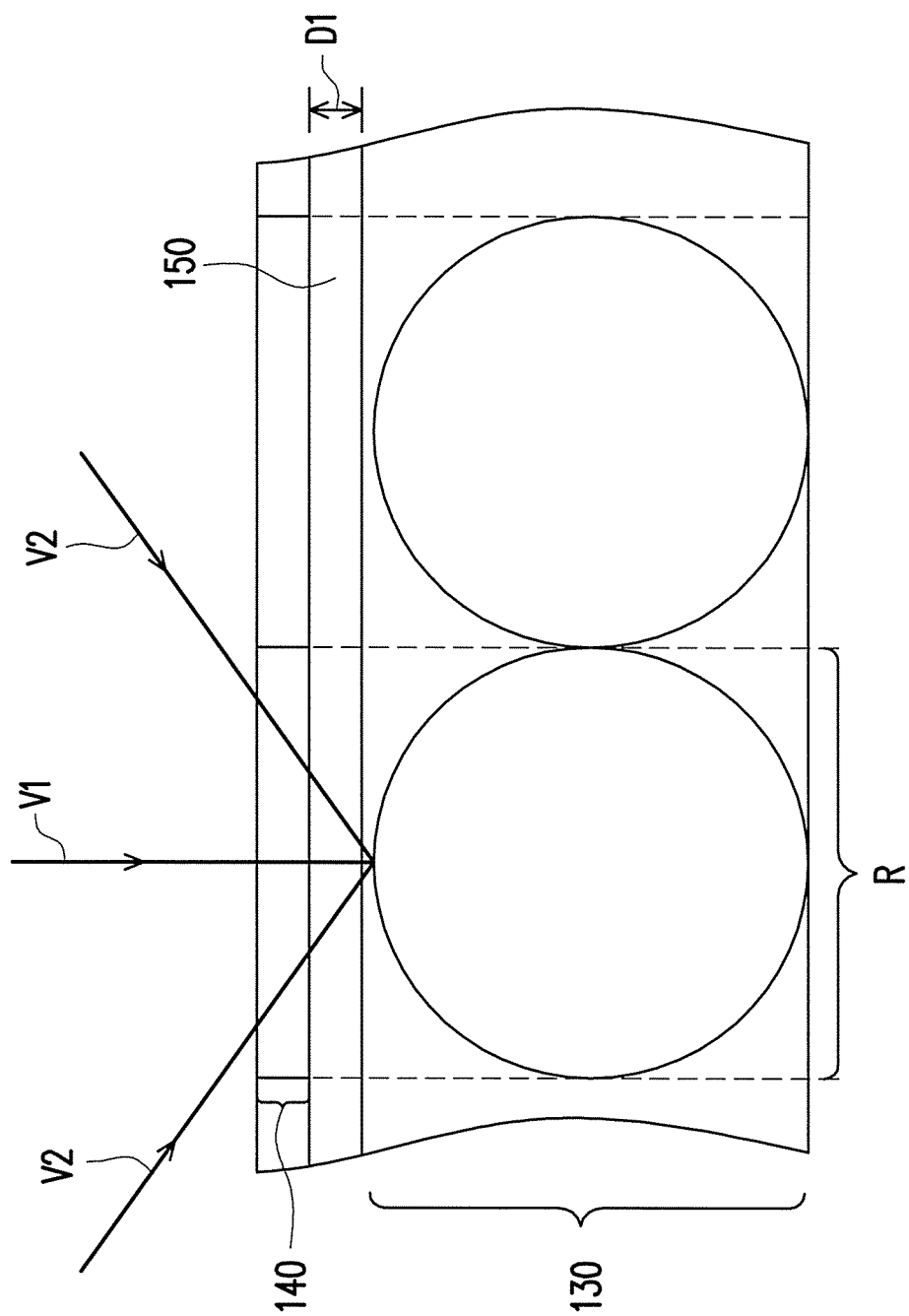
FIG. 2 schematically illustrates a distance between a display layer and a color filter layer according to an embodiment of the invention.
Figure 3:
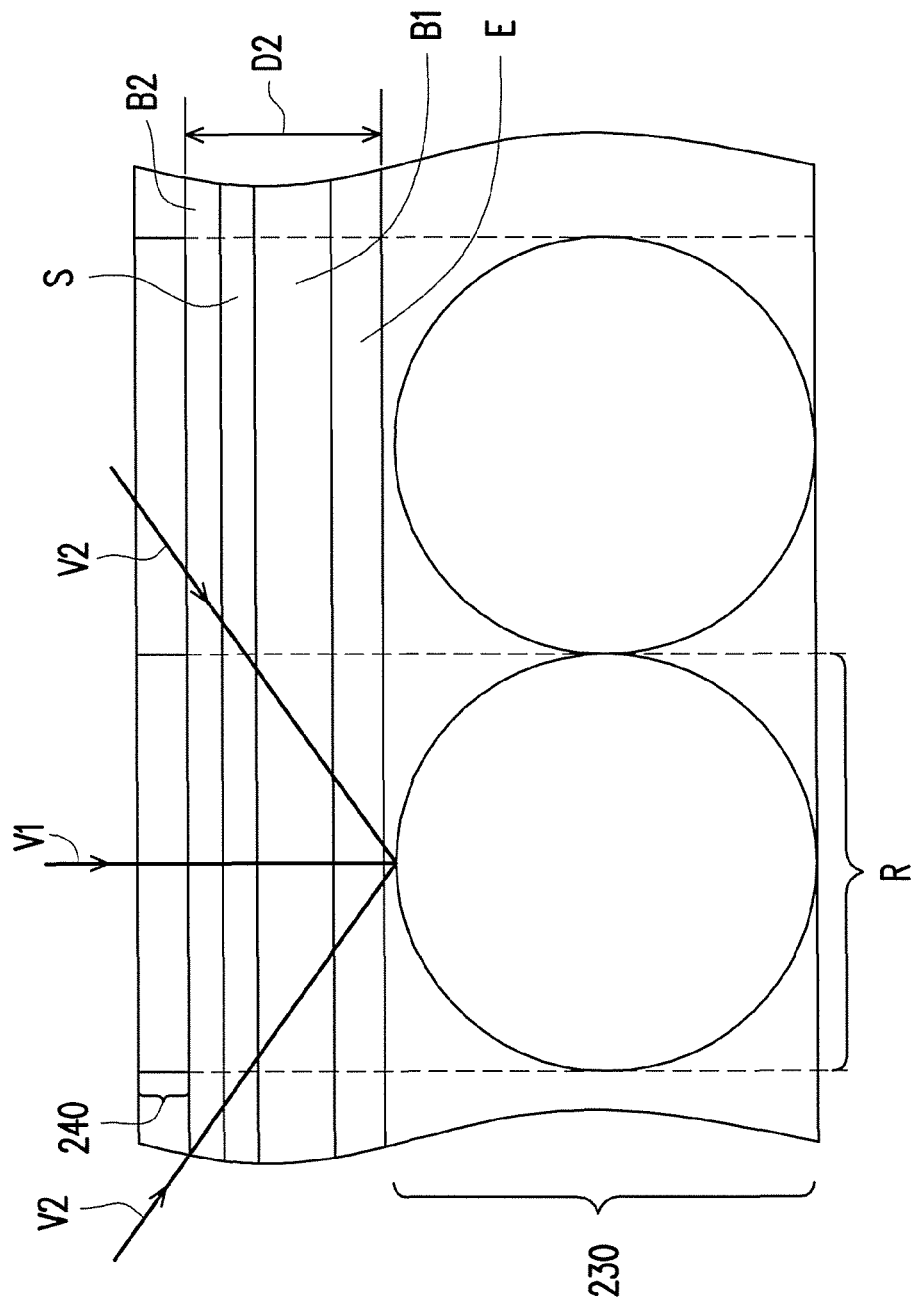
FIG. 3 schematically illustrates a distance between the display layer and the color filter layer according to a conventional design.

Furthermore, in the display device 100 of the present embodiment, there is no additional adhesive layer or substrate between the display layer 130 and the color filter layer 140, and this is helpful in enhancing the display quality of the display device 100. FIG. 2 schematically illustrates a distance D1 between a display layer and a color filter layer according to an embodiment of the invention. FIG. 3 schematically illustrates a distance D2 between the display layer and the color filter layer according to a conventional design. FIG. 2 represents that the structural design of the display layer 130 and the color filter layer 140 of the display device 100 in the embodiment of the invention. FIG. 3 is the conventional design, wherein an electrode layer E, a substrate B1, an adhesive layer S and a substrate B2 are disposed between a display layer 230 and a color filter layer 240. Specifically, in the design of FIG. 3, the electrode layer E and the display layer 230 are both formed on the substrate B1, and the color filter layer 240 is formed on the substrate B2. Moreover, the substrate B1 and the substrate B2 are adhered via the adhesive layer S so as to achieve a colorful display effect.

It may be clearly known from FIG. 2 and FIG. 3 that only a layer of transparent electrode layer 150 is disposed between the display layer 130 and the color filter layer 140, and the electrode layer E1, while the substrate B1, the adhesive layer S and the substrate B2 are disposed between display layer 230 and the color filter layer 240. Therefore, the distance D1 between the display layer 130 and the color filter layer 140 is smaller than the distance D2 between the display layer 230 and the color filter layer 240.

The color filter layers 140 and 240 are both substantially constituted by a variety of color patterns arranged in arrays. When viewing a pixel R of FIG. 2 along a face-forward direction V1, an image seen by a user is a color rendered by the light passing through a color pattern corresponded to the pixel R. When viewing the pixel R of FIG. 2 along a side-view direction V2, an image seen by the user is still the color rendered by the same color pattern.

Similarity, when viewing a pixel R of FIG. 3 along the face-forward direction V1, an image seen by the user is a color rendered by the light passing through a color pattern corresponded to the pixel R. However, when viewing the pixel R of FIG. 3 along the side-view direction V2, an image seen by the user is a color rendered by another color pattern. Therefore, a display color of the display device of FIG. 3 in the side-view direction V2 is different a display color in the face-forward direction V1, and this means that, the display device is unable to provide a favorable display quality in the side-view direction V2; namely, the display device has a problem of having a narrow viewing angle. In contrast, the display device of FIG. 2, because of applying the design of the embodiment illustrated in FIG. 1, may effectively improve a disadvantage of the narrow viewing angle. Therefore, the display device 100 of the embodiment illustrated in FIG. 1 of the invention, in addition to being less prone to produce the displacement in relative to the positions of the components due to the fabrication process of the transparent sealing 160, may also have an enhancement in the viewing angle of the display viewing angle due to shortening the distance between color filter layer 140 and the display layer 130.

In summary, in the display device of the embodiment of the invention, since the color filter layer is formed on the display layer via the non-adhesion method, the distance between the color filter layer and the display layer is reduced. As a result, the display device may have the favorable display quality, and the viewing angle of the display device may be enhanced. Moreover, in the display device of the embodiment of the invention, the transparent sealing used to seal the display layer is the light curable resin or the low-normal temperature curable resin. Thereof, the fabrication process of the transparent sealing does not produce the temperature impact to the already formed components, and thereby is helpful in enhancing the yield of the display device.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A display device comprising;
a first substrate;
a second substrate opposite to the first substrate;
a display layer disposed between the first substrate and the second substrate, wherein the display layer is an electrophoretic display layer having a plurality of units physically independent from one another;
a color filter layer disposed between the display layer and the first substrate, wherein a light reflected by the display layer passes through the color filter layer and is subsequently viewed by a user;
a transparent electrode layer disposed between the color filter layer and the display layer; and
a transparent sealing, the first substrate and the second substrate being connected through the transparent sealing to form a sealing space demarcated by the first substrate, the second substrate and the transparent sealing so that the display layer and the color filter layer are sealed in the sealing space, wherein a curable temperature of the transparent sealing is lower than or equal to 40° C.

2. The display device as recited in claim 1, wherein the transparent electrode layer is formed onto the color filter layer via a non-adhesion manner.

3. The display device as recited in claim 1 further comprising a protective film and an adhesive layer, wherein the protective film is adhered on the first substrate via the adhesive layer, and the transparent sealing is located between the protective film and the second substrate.

4. The display device as recited in claim 3, wherein the protective film is an anti-reflective film, an anti-glare film, an anti-UV film, a light directing film, a polarizing film, an anti-scratch film or a combination thereof.

5. The display device as recited in claim 1, wherein a material of the transparent sealing is a room temperature curable resin.

6. The display device as recited in claim 1, wherein a material of the transparent sealing is a light curable resin.

7. The display device as recited in claim 1 further comprising an active device layer disposed between the second substrate and the display layer.

8. The display device as recited in claim 1, wherein the display layer comprises a microencapsulated electrophoretic display layer or a microcup electrophoretic display layer.

9. The display device as recited in claim 1, wherein the first substrate and the second substrate are each a glass substrate or a plastic substrate.

10. The display device as recited in claim 1, wherein a material of the color filter layer comprises an ink.

11. The display device as recited in claim 1, wherein a material of the transparent electrode layer comprises an organic conductive material, an oxide conductive material or a combination thereof.

12. The display device as recited in claim 11, wherein the organic conductive material comprises a polyethylene dioxythiophene (PEDOT) or a polyaniline (PANi).

13. The display device as recited in claim 1 further comprising an adhesive layer, wherein the second substrate and the display layer are adhered to each other via the adhesive layer.

14. A fabrication method of a display device, comprising:
sequentially forming a color filter layer and a transparent electrode layer on a first substrate, and the color filter layer located between the first substrate and the transparent electrode layer;
forming a display layer on the transparent electrode layer, wherein the display layer is an electrophoretic display layer having a plurality of units physically independent from one another and a light reflected by the display layer passes through the color filter layer and is subsequently viewed by a user; and
forming a transparent sealing connecting the first substrate to a second substrate to form a sealing space demarcated by the first substrate, the second substrate and the transparent sealing, such that the transparent sealing seals and surrounds the display layer and the color filter layer between the first substrate and the second substrate, wherein a process temperature of curing the transparent sealing is lower than or equal to 40° C.

15. The fabrication method of the display device as recited in claim 14, wherein a material of the transparent sealing is a light curable resin.

16. The fabrication method of the display device as recited in claim 14 further comprising adhering a protective film on the first substrate via an adhesive layer, and enabling the transparent sealing to locate between the protective film and the second substrate when forming the transparent sealing.

17. The fabrication method of the display device as recited in claim 14, wherein the color filter layer is formed on the first substrate via an ink-jet method.

18. The fabrication method of the display device as recited in claim 14, wherein the transparent electrode layer is formed on the color filter layer via a coating method.

19. The fabrication method of the display device as recited in claim 14, wherein a material of the transparent electrode layer comprises a polyethylene dioxythiophene (PEDOT) or a polyaniline (PANi).

20. The fabrication method of the display device as recited in claim 14 further comprising adhering the second substrate onto the display layer via an adhesive layer before forming the transparent sealing.

21. The fabrication method of the display device as recited in claim 14 further comprising forming an active device layer on the second substrate, wherein the active device layer is located between the second substrate and the display layer.

* * * * *